United States Patent [19]

DiVito

[11] Patent Number: 4,842,326
[45] Date of Patent: Jun. 27, 1989

[54] MOTOR VEHICLES WITH INTERCHANGEABLE FUNCTIONAL BODY MODULES

[75] Inventor: Robert DiVito, Springfield, Pa.

[73] Assignee: John A. DiVito, Springfield, Pa.

[21] Appl. No.: 48,018

[22] Filed: May 8, 1987

[51] Int. Cl.[4] .............................................. B62D 25/08
[52] U.S. Cl. .................................. 296/196; 296/197; 296/10; 296/35.3
[58] Field of Search ....................... 296/10, 35.3, 99 R, 296/183, 185, 193–197

[56] References Cited

U.S. PATENT DOCUMENTS

| | | | |
|---|---|---|---|
| 2,307,172 | 1/1943 | Van Hooser | 296/35.1 |
| 2,591,380 | 4/1952 | Schreiner | 296/10 X |
| 3,722,948 | 3/1973 | Walsh et al. | 296/35.3 |
| 4,000,924 | 1/1977 | Blasingame | 296/35.3 |
| 4,079,986 | 3/1978 | Redford | 296/35.3 X |
| 4,282,641 | 8/1981 | Phillips | 29/416 |
| 4,339,148 | 7/1982 | Smith et al. | 296/35.3 |
| 4,422,685 | 12/1983 | Bonfilio et al. | 296/197 |
| 4,489,977 | 12/1984 | Earing, Jr. | 296/35.3 |
| 4,676,545 | 6/1987 | Bonfilio et al. | 296/197 |

FOREIGN PATENT DOCUMENTS

| | | | |
|---|---|---|---|
| 2403088 | 7/1975 | Fed. Rep. of Germany | 296/196 |
| 3025145 | 3/1982 | Fed. Rep. of Germany | 296/196 |
| 255283 | 2/1949 | France | 296/183 |
| 509388 | 1/1955 | Italy | 296/196 |

*Primary Examiner*—Dennis H. Pedder

[57] ABSTRACT

Modular motor vehicles are provided with a plurality of independently operable functionally different automobile and truck type core vehicles and a plurality of interchangeable functionally different body and chassis modules attachable to the core vehicles. The core vehicles utilize standardized first engagement means including frames and adapter plate elements connected to or "unitized" into the core vehicles. Said first engagement means of the cores have positioning elements and alternating connecting elements at standardized predetermined spacing and location defining a structurally rigid bed for the modules. The modules incorporate a second engagement means, located and spaced to compliment said first engagement means, making it possible to easily align, connect and disconnect the modules with respect to the core vehicles. The modules incorporate a third engagement means to align and connect the multiple-piece modules together. Second and third engagement elements can be discrete entities attached to the modules or "unitized" into the modules themselves. The core vehicles include front, mid and rear engine configurations.

2 Claims, 8 Drawing Sheets

MOTOR VEHICLES WITH INTERCHANGEABLE FUNCTIONAL BODY MODULES

BACKGROUND OF INVENTION

1. Field of Invention

This invention relates to the field of vehicle body structures, and in particular to vehicles with readily replaceable modules according to a plurality of designs and functions.

2. Prior Art

Vehicles are currently sold in which a single engine and frame can be embodied with any one of a number of optional body structures as determined by a purchaser's order. A given make and model of automobile, for example, is offered with any of various body parts that can be selected according to the puchaser's option. Among the options are a station wagon or coupe, two or four doors, hatchback or sedan back, and the like. Some styles are available in which the seller adds design elements tending to make the automobile more recognizable for a given style or character, e.g., a racier version of a basic car, or a heavier duty version, etc. Although such vehicles give the user a wide initial choice of vehicle product, and allow the manufacturer a certain standardization by employing some of the same underlying vehicle structures for all the models, these vehicles are not adapted to allow the ultimate purchaser to readily change body styles, functional modules or the like once the automobile has been built. The optional design or functional parts of automobiles on sale are so intimately and permanently attached to fhe vehicle that any attempt to change options after the fact amounts to remanufacturing the vehicle. Typically such changes require cutting and welding, replacement of incidental parts of the basic vehicle and the like.

In connection with trucks, flat bed trucks having a cab and a bare frame are sold to specialty manufacturers that outfit trucks for a certain trade or function. The various types of specialty trucks, all of which have the same frame and cab elements, may be outfitted according to a number of optional particulars. For example, a plummer may require a truck having externally-accessible tool storage, internal part storage and means for holding pipes. A painter may require a ladder receptacle. A truck for an automobile service station may be arranged as a pickup truck or a tow truck. Nevertheless, whether the vehicle is manufactured by the original automobile company or by a specialty customizing company, in each case the manufactured vehicle is a permanently-manufactured one, and not one in which the functional or design elements can be readily changed thereafter.

Known vehicles are characterized by replaced or installed elements that are relatively permanently attached with permanent alteration to the basic vehicle by means of cutting and welding, extensive use of bolts, rivets and other relatively permanent fasteners and the like.

The present invention concerns making the functional and design elements of vehicles removable and replaceable by means of readily interchangeable modules that can be attached to functionally different core vehicles. The invention has modules removable and replaceable as easily as one might remove or replace rear seats in a removable-seat passenger van ot the winter hard top on a T-top or convertible-top car. Regularly spaced fasteners including positioning and connecting elements are provided on core vehicles and define a pattern adapted to receive any of a plurality of interchangeable body and chassis modules, each fittable to the pattern of fasteners. The modules can include alternative design elements or alternative functional elements or both.

SUMMARY OF INVENTION

It is an object of the invention to provide modular vehicles having readily replaceable design and functional modules.

It is also an object of the invention to provide such vehicles in which standardized frame and cab portions are common to a large number of possible designs, thereby standardizing manufacture of the core vehicles and the modules.

It is a further object of the invention to drastically reduce the time, cost and effort required of the ultimate consumer, to modify an existing car when changing between design and/or functional characteristics.

It is another object of the invention to minimize the expense and maximize the versatility of vehicles generally by making each vehicle particularly adaptable to a plurality of differentn design and functional uses.

These and other objects are accomplished by a modular vehicle provided with one of a plurality of functionally different, self-sufficient core vehicles having standardized first engagement frame sections and first engagement adapter plate attached to or "unitized" to the core vehicles. The first engagement sections are provided with a plurality of positioning and connector elements at predetermined spacing and location. At least two interchangeable modules having a second engagement frame sections having alignment and connector elements mountable with the first engagement means of the core vehicles allow the user to readily remove and replace design and/or functional modules on the core vehicles. The alignment and connector elements are preferably adapted for male/female operation with respect to either the core vehicle or attachable modules. The functional modules include design oriented modules whereby the user can choose between body styles, and also utilitarian modules. The utilitarian modules may be passenger compartments, occupational and receational types, storage modules and the like. In each case the modules are fittable and positively positioned by the standardized, regularly spaced alignment and connecting elements.

BRIEF DESCRIPTION OF THE DRAWINGS

The drawings contained herein show representative examples of the preferred embodiments and are subject to various groupings of elements. The figures have been totally or partially computer enhanced and slanted and curved lines are shown as a rough series of short straight lines.

REFERENCE NUMERALS USED FOR IDENTIFICATION

In order to facilitate understanding of the invention as shown and described, a numbering system is employed in the drawings with common digits used to refer to structures common to the respective embodiments. These reference numbers are incorporated herein for disclosure of the common structures, in lieu of repetitive mention of such structures for each instance in which they occur. The reference numeral system is keyed as follows:

CORE VEHICLE IDENTIFICATION

Core vehicles herein each have a core vehicle identification number with 4 digits followed by a letter. The first number in the series denotes the general type of core vehicle to which reference is made. The last number in the series denotes the number of doors on that core vehicle. The final letter denotes one of three possibilities, namely:

(1) "F" denotes that the core is a frame type, i.e., the core has a "modified conventional frame";

(2) "U" denotes that the core is a "unibody" type, i.e., the core has a "modified unibody structure"; and, (3) "B" denotes that the core can be either "modified conventional frame" or "modified unibody structure" or "Both".

The vehicle identification reference numbers fall into the following general types, with specific examples listed:

AUTOMOBILE TYPE CORE VEHICLES (1000 Series)

1002F-two doors/modified conventional frame;
1002U-two doors/modified unibody structure;
1002B-Either or both 1002F and 1002U;
1004F-four doors/modified conventional frame;
1004U-four doors/modified unibody structure;
1004B-Either or both 1004F and 1004U;

TRUCK TYPE CORE VEHICLES (2000 Series)

2002F-two doors/modified conventional frame;
2004F-four doors/modified conventional frame;

ALTERNATE ELONGATED CORE VEHICLES (3000 Series)

3004F-four doors/modified elongated conventional frame and so forth.

PARTS IDENTIFICATION

With reference to particular parts to which reference is made, the following numerals identify parts associated with the core vehicles and modules:

PARTS LISTING

21. Front wheels
22. Rear wheels
23. Preferred engine compartment
24. Passenger compartment (two door)
25. Passenger compartment (four door)
26. 1st engagement frame deck section (positioned along standardized deck area)**
27. 1st engagement frame section ** 28.
Modified conventional frame (two door) *
29. 1st engagement adapter plate (used to attach modules as well as incidentals associated with the modules (e.g. seats, equipment, etc.) to the floor section of the core vehicle ***
30. 1st engagement frame section **
31. Modified conventional frame (four door) *
32. Modified floor section of "UNIBODY" structure (two door) *
33. Modified floor section of "UNIBODY" structure (four door) *
34. Alternate 1st engagement adapter plate (used to attach modules as well as drivetrain components in mid-engine and rear engine core vehicles) ***
36. 2nd engagement frame section ****
37. 2nd engagement frame section ****
38. 2nd engagement frame section ****
39. 3rd engagement frame section (mates with #40) ****
40. 3rd engagement frame section (mates with #39) ****
41. 3rd engagement frame section (mates with #42) ****
42. 3rd engagement frame section (mates with #41) ****
43. 3rd engagement frame section ****
44. 2nd engagement frame section (mates with 1st engagement means located in the floor section of the various core vehicles) ****
45. Aligning pins for modules
46. Corresponding female aligning elements incorporated into frames.
47. Cushion/weatherproof gasket
48. "Quick-change" connector for modules 49. Corresponding female element of frame (mates with "quick-change" connector #48)
50. Bi-directional threaded section for attachment of modules
51. Bolt-type connectors for modules (threads run through threaded section #50)
52. Key-type lock for frame sections 53. Male electrical connector for modules 54. Corresponding female electrical connector for for connector #53 55. 1st engagement frame section (roof mount in elongated vehicles)  56. 1st engagement frame deck section (elongated vehicles)  100. Opaque or transparent T-top 101. Coupe/Sedan type module 102. Rear trunk module for use with coupe/targa/convertible modules 103. Rear spoiler 104. Ground effects kit (side skirts and wide front and rear wheel wells) 105. Folding convertible top module 106. two plus two rear window module 107. Hinged fastback module 108. Rear body module for use with fastback/station wagon/ and some truck modules 109. Standard size fenders 110. Station wagon type module 111. Rear window module for use with some truck modules 112. Pick-up truck rear module with tailgate (may be self-contained)

113. Delivery van type module
114. Utility type module with storage compartments
115. Camper Cap rear module
116. Camper back module (may be self-contained)
117. Super-wide truck fenders
118. Dual rear tires for use with heavy-duty truck modules
119. Flatbed rear deck module
120. Stake-body addition for flatbed
121. Full length module to completely seal off passenger compartment of core vehicle (may contain window or not) for use with some truck type modules
122. Dumping rear module
123. Tow truck type rear module
124. "5th wheel" type towing rear module
125. Rear passenger opaque or transparent T-top (four door)
126. Folding convertible module (elongated vehicles)
127. Conventional trunk module (elongated vehicles)
128. Opaque or transparent hardtop module (elongated vehicles)
129. Stationwagon module (elongated vehicles
130. Ambulance type rear module (may be self-contained) elongated vehicles
131. Flower car module (self-contained) (elongated vehicles)
132. Hearse module (self-contained) (elongated vehicles)

(*) These sections incorporate 1st engagement frames located in the floor sections of the various core vehicles (may be discrete frame sections or "unitized" to the core vehicles)

() May be discrete frame sections or "unitized" to the core vehicles and/or modules (*) May be a discrete plate or "unitized" into the core vehicles (****) Include positioning and connecting elements

DETAILED DESCRIPTION OF PREFERRED EMBODIMENTS

Figure 1:
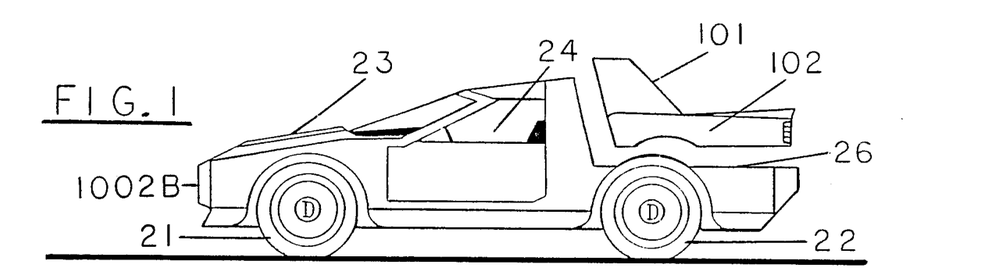
FIG. 1 is an exploded side view of a 2 door automobile type core vehicle, a rear module characteristic of a standard coupe being shown exploded from the core.

FIG. 1 shows a two door core vehicle 1002B with modules 101 and 102 positioned over their intended location incident to attachment or removal. Core 1002B includes all the particulars of a self-sufficient, independently operable and useful vehicle at least to carry the driver from place to place. An engine is preferably mounted in compartment 23 and is operable to drive front wheels 21, rear wheels 22, or all 4 wheels. Engine compartment 3 is shown at the preferred location in the front of the vehicle; engine may be mid-mounted or rear-mounted, but will restrict the number of modules that can be used at that location. The vehicle is controllable from operator/passenger compartment 24. The vehicle is carried on a chassis, which may have modified conventional frame elements (FIG. 6), or modified unibody structure (with elements analogous to frame elements, formed from channel-like bodies, i.e., folded sheet metal defining an integral construction in which frame and body are both defined by continuously attached sheet metal elements (FIG. 7)). All core vehicles could be operated without any functional modules at all, but preferably is at least provided with a minimum panel covering the rear of the driver/passenger compartment. Conventional underbody elements such as exhaust system, drive train, suspension parts, etc. (not shown) are conventionally mounted along the underside of all core vehicles.

At the user's option, the space on a standardized frame/deck area 26, at the rear of the core vehicle's passenger compartment can be outfitted with any of a plurality of modular elements such as additional passenger compartments, storage compartments and/or portions defining design and/or functional modules of one character or another; a plurality of specific elements are illustrated in FIGS. 11(a) through 11(m). As long as the dimensions of frame/deck area 26 and/or the dimensions of the other engagement means (discussed hereinafter) remain the same, the core vehicle can otherwise differ in size, appearance, shape, or function, and nevertheless can utilize the same modules. This also gives the core vehicle the ability to change, when necessary, year after year.

Figure 2:
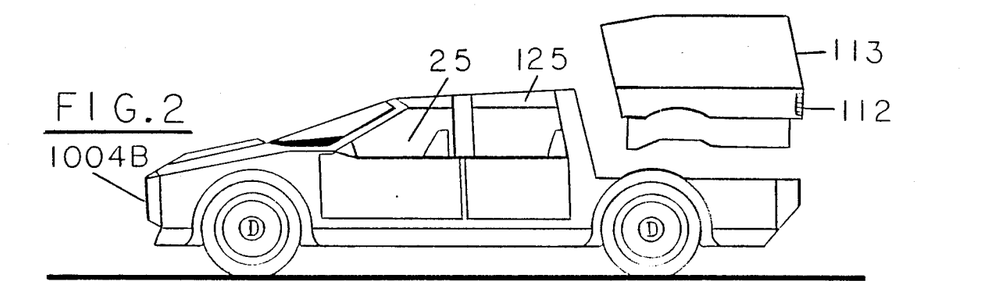
FIG. 2 is an exploded side view of a 4 door automobile type core vehicle, a self-contained delivery van rear module exploded from the core.

The core vehicle 1004B in FIG. 2 differs only insofar as it has a four door configuration at its driver/passenger area 25. It may have a removable rear roof section 125. It is shown with self-contained delivery van type modules positioned over their intended location.

Figure 3:
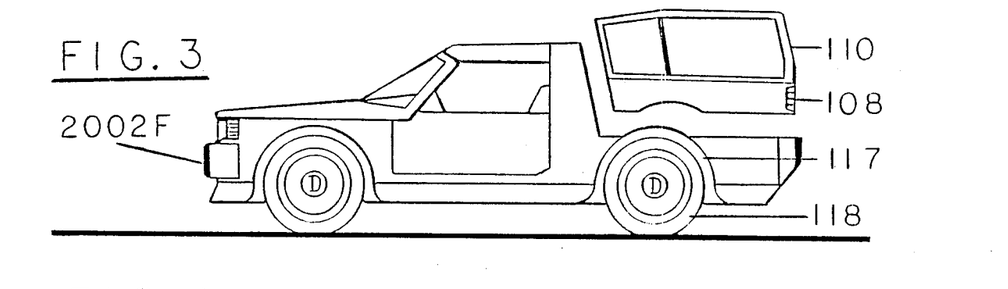
FIG. 3 is an exploded side view of a 2 door truck-type core vehicle, a station wagon/passenger truck module being shown exploded from the core.

Core vehicle 2002F in FIG. 3 is a truck type which may have heavy duty components, modified conventional truck frame, increased ground clearance, wide rear fenders 117 to accomodate dual rear truck tires 118, etc. It is shown with passenger compartments 108 and 110 positioned above their intended location.

In FIGS. 2 and 3 we demonstrate the ability to change an automobile into a truck and a truck into an automobile by the appropriate changing of functional modules.

Figure 4:
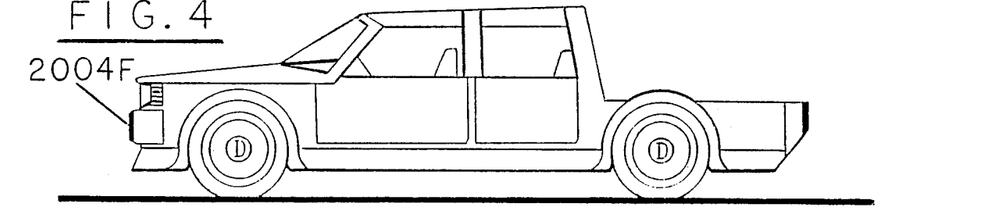
FIG. 4 is a side view of a 4 door truck type core vehicle shown without any modules in place.

In FIG. 4, core vehicle 2004F is the same as in FIG. 3, but differs only insofar as it has a four door configuration.

Figure 5:
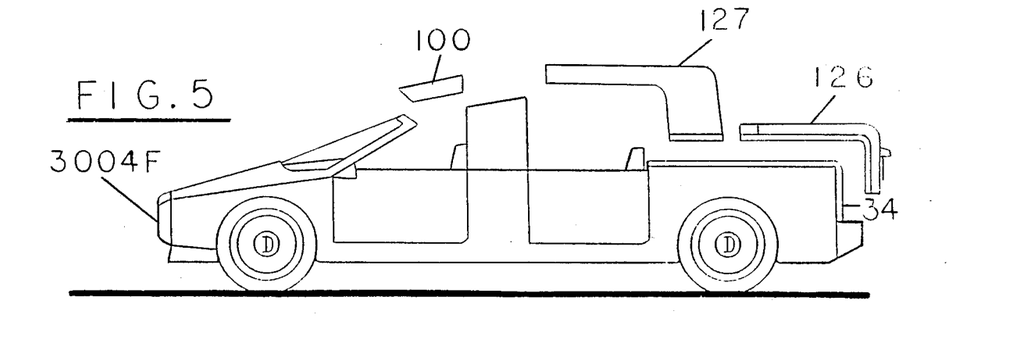
FIG. 5 is a side view of an alternate elongated core vehicle limosine rear modules being shown exploded from the core vehicle, an ambulance rear module attached to the core.
Figure 6A:
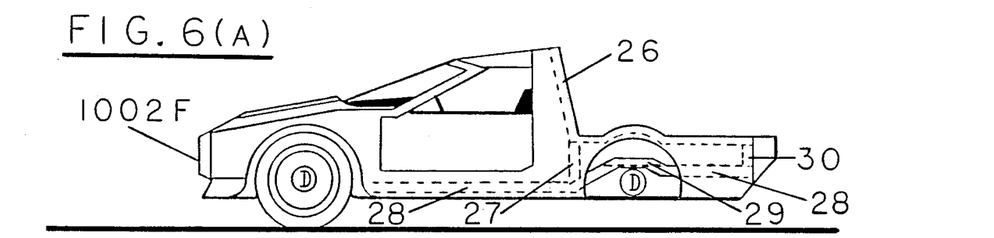
FIGS. 6(a) through 6(e) show partially cut away side and top views of core vehicles which have a modified conventional frame configuration.
Figure 6B:
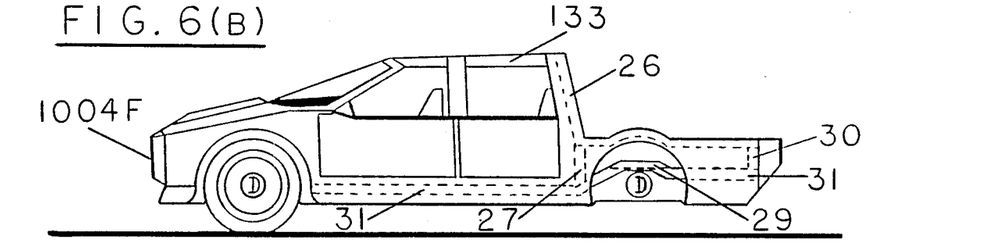
Figure 6C:
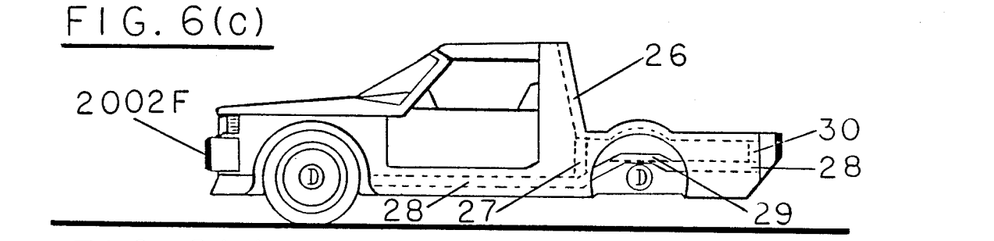
Figure 6D:
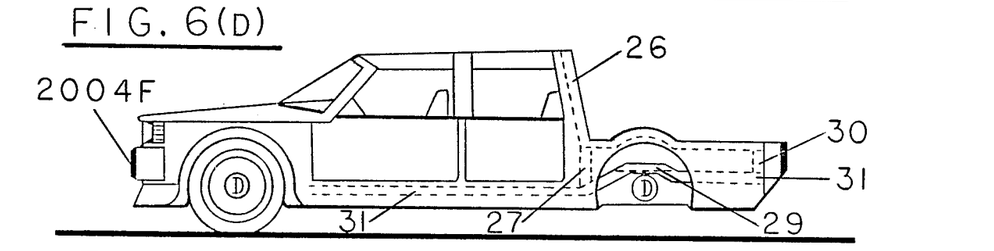
Figure 6E:
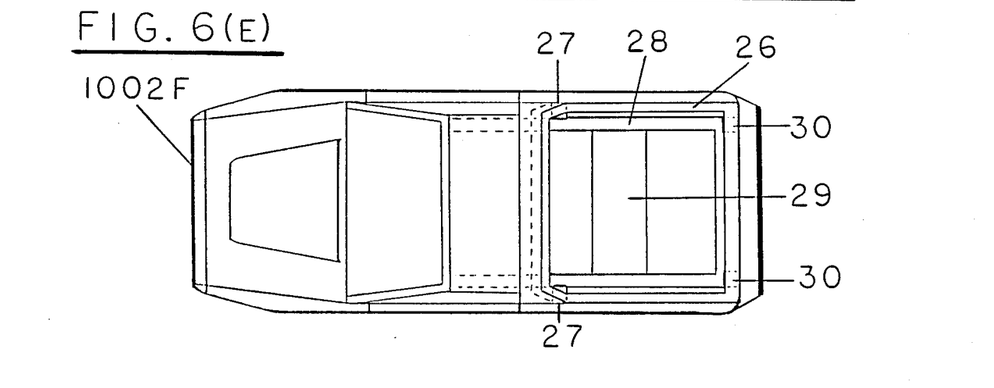

Core 3004F, shown in FIG. 5, is an elongated vehicle which will accomodate limosine type rear modules and also other modules associated with that particular length vehicle (see also FIG. 12). Core 3004F is shown in FIG. 5 with limosine modules 126 and 127 removably positioned above their intended location. Core 3004F may also have a removable roof for the chauffeur compartment. The 3000 Series core vehicle is shown with alternate frame deck section 34 (see also FIG. 12(a)), which also accomodates trunk or rear door sections of its matching modules. Core 3004F also has a modified commercial chassis.

In the various views of FIG. 6, sectional side and top elevation views of core vehicles with modified conventional frame elements. Adapter plate 29 is positioned above the rear axle and in between the conventional frame members 28 or 31, depending upon the size of the vehicle. Modified conventional frame members 28 and 31, adapter plate 29, and modular frame sections 26, and spacer sections 27 and 30 are characterized by standardized dimensions and fastener positioning and will accept any of the various replacable modules due to this standardization. Many of these modules may attach only to frame/deck area 26, but self-contained and heavy-duty functional modules may attach as well along these other frames and adapter plate sections. FIG. 6(e) is a plan view of the core shown in FIG. 6a, but except for the difference in length of modified conventional frame sections 28 and 31, the first engagement frames and adapter plate sections are identical in all 1000, 2000 Series core vehicles (see also FIG. 12).

Figure 7A:
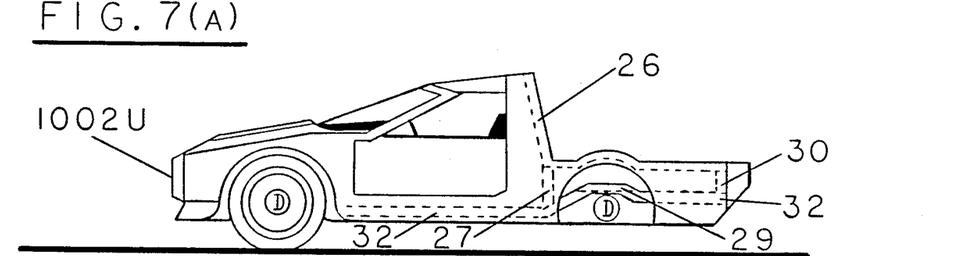
FIGS. 7(a) through 7(c) show partially cut away side and top views of core vehicles which have a modified "unibody" configuration.
Figure 7B:
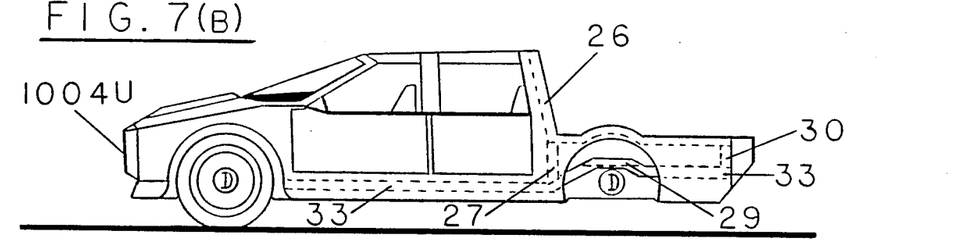
Figure 7C:
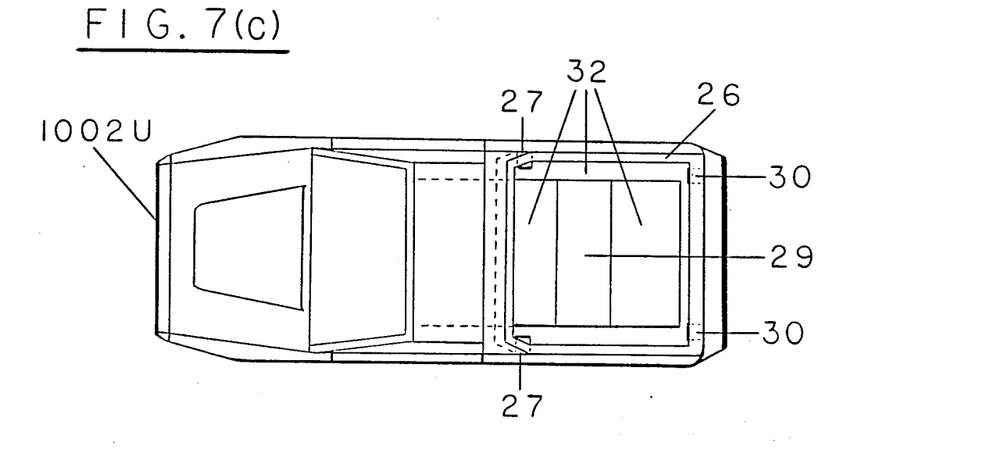

In FIGS. 7(a) through 7(c) are shown sectional side and top elevation views of core vehicles with modified unibody construction. The difference is that any or all of the first engagement means are built into the modified unibody construction. Standardized dimensions, alignment and connector positions are identical in unibody type core vehicles and modified conventional frame type core vehicles, therefore the modules (FIGS. 9 and 11) will be connectable to both 1000 and 2000 Series core vehicles as well. FIG. 7(c) is a plan view of the core shown in FIG. 7(a), but except for the difference in length of 32 and 33, all the first engagement dimensions, alignment and connector positions are identical in both vehicles shown in FIGS. 7(a) and 7(b) and to all 1000 and 2000 Series core vehicles.

Figure 8A:
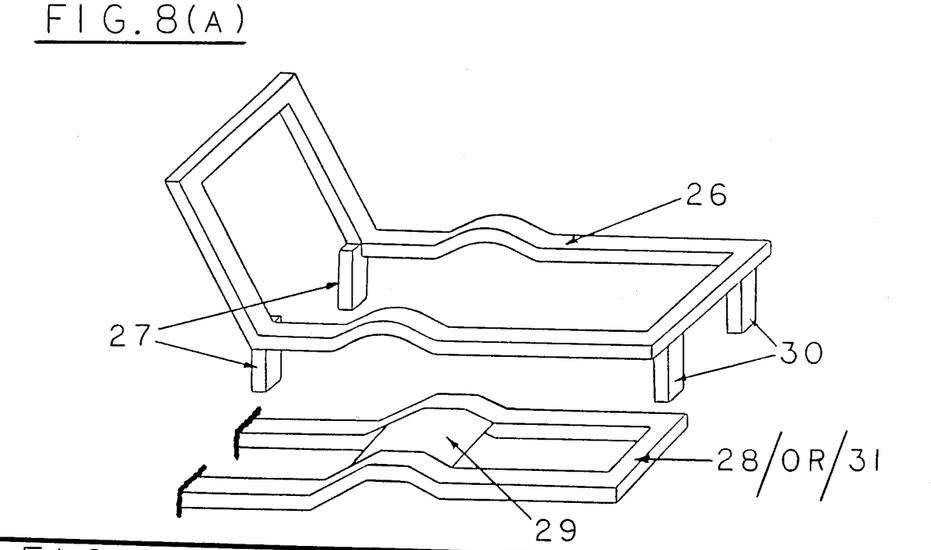
FIGS. 8(a) and 8(b) show three dimensional views of: discrete first engagement frames and adapter plate built upon and incorporated into the conventional frame structures motor vehicles (FIG. 8(a)); and, first engagement means incorporated into the "unibody" structures of motor vehicles (FIG. 8(b)), which are each incorporated into the various core vehicles.
Figure 8B:
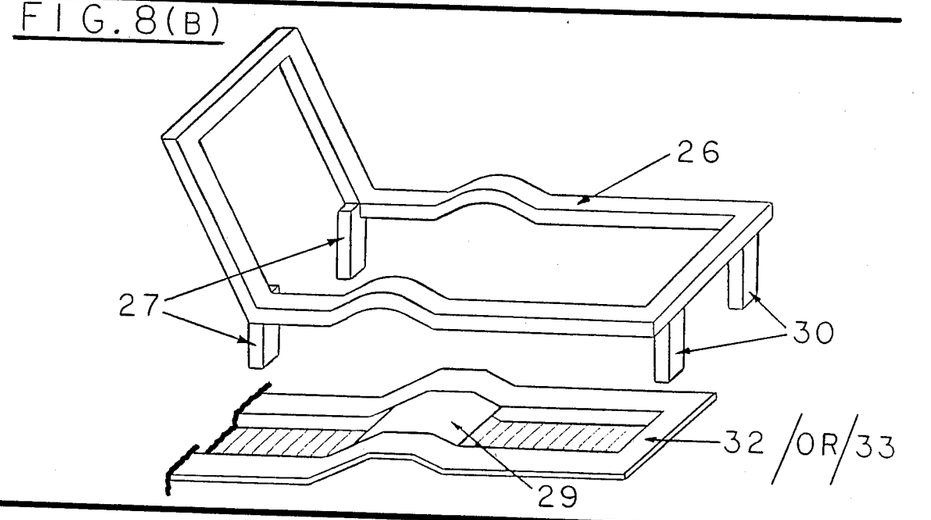

In FIGS. 8(a) and 8(b) are shown preferred first engagement areas which are attached to or unitized into the core vehicles described herein. Frame/deck section 26 is mounted at lowest, widest available position on the core vehicle to thereby allow a greater selection of design and functional modules. First engagement frame sections 27 and 30 have multiple functions which may include support for frame 26, additional attachment areas, and/or slotted areas to help align and support the self-contained and heavy-duty modules. They may also be spaced intermittantly along the horizontal plane of deck/frame 26 in FIG. 8(a) and 8(b). Adapter plate 29 is designed to attach functional elements to the floor of the core vehicle, for example, supporting extra passenger seats, 5th wheel, or other functional elements that may need to be attached at this position. In FIG. 8(a) first engagement alignment and connecting elements are incorporated into modified conventional frame sections 28 and 31, and will be used for alignment, support, and attachment of modules which extend below deck/frame 26. In FIG. 8(b) we have a modified unibody configuration, whereas 32 and 33 define altered floor sections of core vehicles. Alignment and attachment areas are unitized into this section as is adapter plate 29.

FIG. 9 shows different types of modular body section configurations (1000 and 2000 Series) that can be installed and/or grouped for specific functional modules.

Figure 9A:
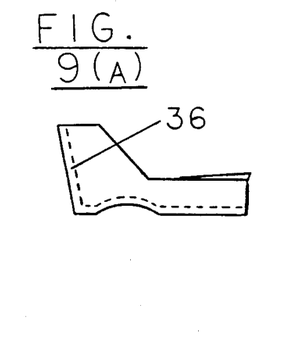
FIGS. 9(a) through 9(i) show sectional side views of different types of modular section configurations shown with second engagement frame members which attach the modules to the core vehicles, and third engagement frame members which attach the multiple-piece modules together.

FIG. 9(a) is a one-piece non-self-contained auto-type module. Second engagement frame 36 mounts directly to deck/frame section 26 of the core vehicles.

Figures 9B, 9C:
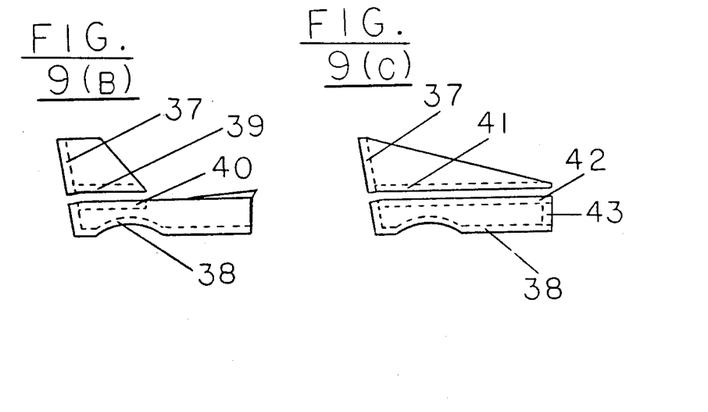

FIG. 9(b) is a two-piece non-self-contained auto-type module. Second engagement frames 377 and 38 combined will attach directly to 26 of the core. Third engagement frames 39 and 40 will mount the modules together.

In FIG. 9(c) a two piece non-self-contained auto-type module which differs insofar as the top module extends to the rear bumper of the core vehicle (eg. fastbacks, stationwagons, etc.,). Third engagement frames 41 and 42 mount the modules together. Frame 43 supports 42 and may also be placed intermittantly accordingly to need.

The configurations in FIGS. 9(a), 9(b), and 9(c) can be used when purchaser intends to use his or her vehicle primarily with automobile-type modules and not wish to change the floor configuration (eg. seats, trunk area, etc.,).

Figure 9D:
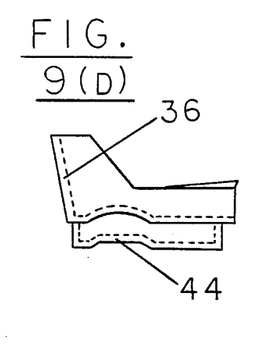
Figure 9E:
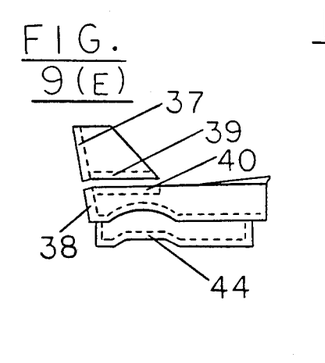
Figure 9F:
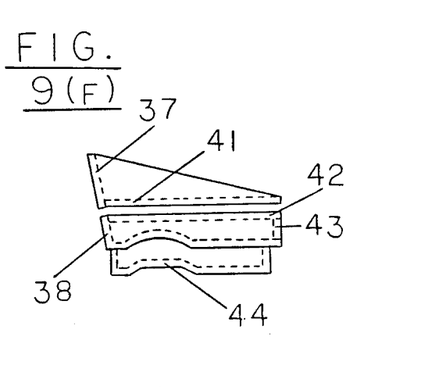

The configurations of FIGS. 9(d), 9(e), and 9(f) are self-contained versions of FIGS. 9(a), 9(b), and 9(c) respectively. Second engagement frame section 44 may be added for support, alignment, and/or attachment of the floor section of these modules to the core vehicles. The configurations in FIGS. 9(d), 9(e), and 9(f) can be used when the puchaser wishes to alternate between automobile-type and truck-type rear modules. This will allow for "Quick changes" (i.e., quickly and conveniently removing a module with its contents and replacing it with a different module with its contents.

Figure 9G:
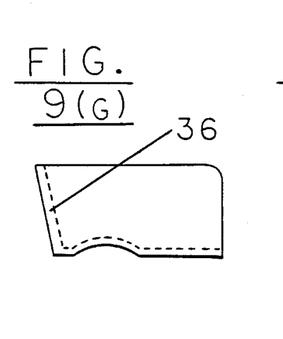

FIG. 9(g) is a one-piece non-self-contained truck-type module. It uses second engagement frame 36 for attachment to the core. This configuration can be used when the purchaser intends to use the vehicle primarily for truck-type options and does not wish to change floor configuration of the core vehicle.

Figure 9H:
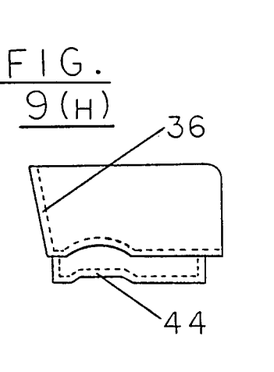

In FIG. 9(h) a one-piece self-contained truck-type module is shown. It may or may not be completely closed-off from the passenger area of the core. The module has a lockable rear or side door allowing safe storage for contents, even when not attached to the core vehicle. It utilizes second engagement frame sections 36 and 44 for attachment to the core.

Figure 9I:
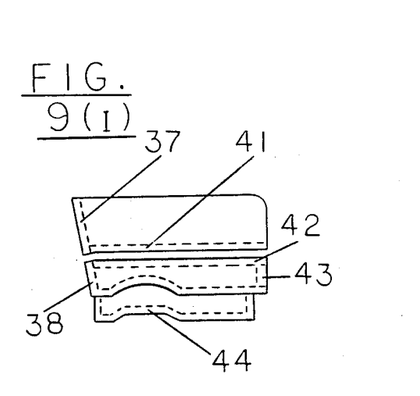
Figure 10A:
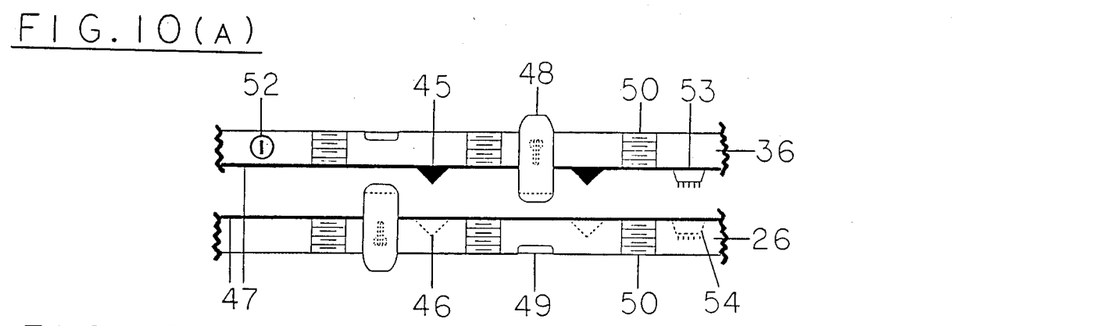
FIGS. 10(a) through 10(d) show preferred means of attachment of the first, second and third engagement frame structures.
Figure 10B:
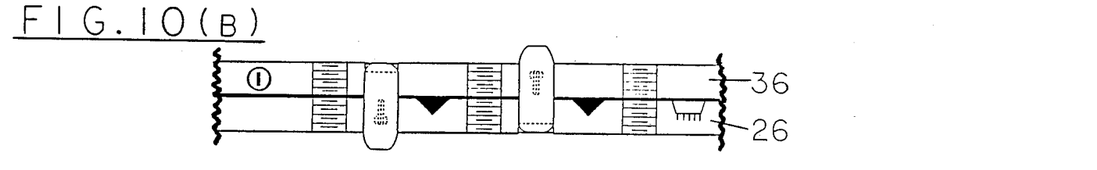
Figure 10C:
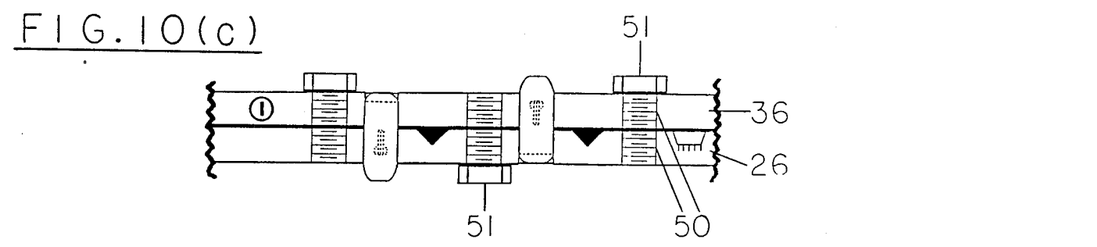
Figure 10D:
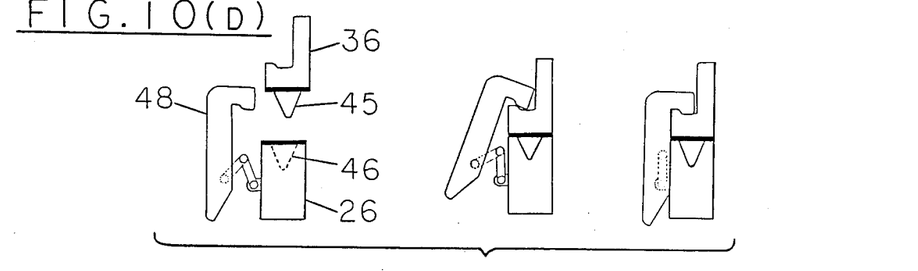

FIG. 9(i) is two-piece self-contained truck-type module. It uses second engagement frame sections 37, 38 and 44 to attach to the core, section 43 for support, and third engagement frames 41 and 42 to attach the modules together.

Frame members 36 thru 44 may be discrete frames or can be unitized into the modules.

It should also be noted that the two-piece modules can be mixed and matched in configurations other than those previously mentioned or specifically shown, as long as the frames which attach the modules are compatable (e.g., 39 with 40, 41 with 42 etc.,). Also, some of the bottom modules shown in two-piece configurations may be used alone. For example, FIG. 9(i) shows a two-piece delivery van arrangement. Removing the top module results in a pick-up type arrangement.

FIG. 10 shows a preferred means of attachment of modules to core vehicles. This means is intended to provide the ability to "Quick-Change" the modules when needed, and also to define a more secure but not completely permanent attachment when needed. Therefore the second engagement frames of the modules and complimenting first engagement frames of the core vehicles comprise a series of alternating types of connectors to serve these purposes. The drawings shows alignment and connector elements 45 through 54 in various locations and stages of interconnection. However, it will be appreciated that the invention may not be restricted to the arrangement shown here, and that elements 45 through 54 may appear on the core vehicles or the modules or both (for example alternated). In any event, elements 45 through 54 are standardized in type and location so that any module can be installed to any corresponding series core vehicle. For purpose of illustration, second engagement frame 36 of a module is being attached to first engagement frame 26 of the core vehicle. To precisely align these frame sections, aligning pins 45 fit into corresponding receptacles 46 in the complimentary frame. Preferably, the protrusions 45 are tapered, whereby slight misalignments of the module with respect to the core vehicle are automatically corrected as these protrusions are pushed more closely into place. Gasket 47 may be provided on the core, module, or both, and will help cushion and seal the connection. The "Quick-change" connectors 48 may appear as simple as the suitcase-type bale and hook, with embodiment in FIG. 10, its operation being shown in FIG. 10(d). The quick-change connectors may also be of the types known and already in use with T-tops, pop-up sunroofs, and removable hardtops, etc. The quick-change connectors may also be embodied as the pin locked type used to secure hoods and other body panels on race cars (i.e., similar to a cotter pin arrangement). Whatever type is used, corresponding receptable 49 is incorporated into its complimentary frame section. FIG. 19(b) illustrates a "Quick-change" type of connection. This arrangement requires no tools and gives the consumer increased ease of modularity. Key lock 52 is used to help secure the module to the core. "Quick-change" connectors may be alternated with a more-permanent type as the bolts in FIG. 10(c). Bolt-type connectors 51 may be installed with lock-washers (not shown). Bolt 51 may be theaded in either direction through both frame members at receptacle 50, both being threaded. It is also possible to have unthreaded bushings on one frame member permitting clearance for bolt 51 to engage into a threaded receptacle 50 in the complementary frame member, or unthreaded bushings in both frame members allowing the use of nuts and bolts (not shown). It is preferred, however, for the purpose of full versatility in the use of modules, that bolt-type connector 51 have this "Bi-directional" ability as shown in FIG. 10(c). It should also be noted that some frame sectios may use both types of connectors, "quick-change" only, or bolt-type only depending upon the need. For example, some roof sections may only need a "Quick-change" type of connector, whereas some of the heavy-duty modules may necessitate the use of the bolt-type connectors. Electrical power can be wired for connection to the modules by electrical connectors engaged when frame sections 36 and 26 are mated. Male electrical connector 53 may be inherently aligned into female connector 54, insuring a proper connection every time, by mating tapered structure as shown. This electrical connection is desirable for use of tail lights and other functional elements which may be incorporated into the various modules. After all the connections are made, vinyl trim may be snapped into place to hide connections & beautify the interior.

FIG. 11 illustrates a number of design and functional modules attached to core vehicle 1002B, but will work equally as well with all 1000 and 2000 Series core vehicles. Modules may have the configurations shown in FIG. 9, and attach as shown in FIG. 10. Modules are shown here in two piece configurations but may be combined into the one piece configurations previously discussed, and modules may or may not be self-contained depending upon consumer needs. Reference can be made to the "Parts Listing" hereinabove for a more detailed description of the modules shown in FIG. 11.

Figure 11A:
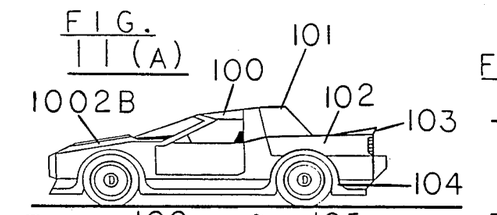
FIGS. 11(a) through 11(m) show side views of various design and functional modules interchangeably attached to a 2 door core vehicle (see also FIG. 5)).
Figure 11B:
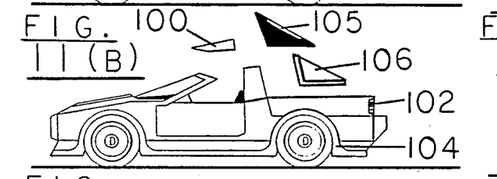
Figure 11C:
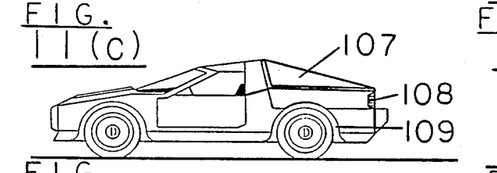
Figure 11D:
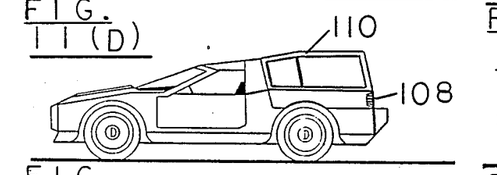
Figure 11E:
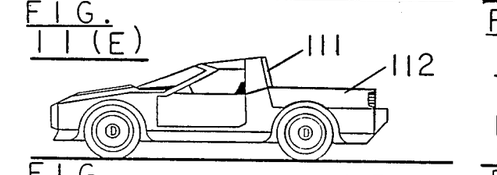
Figure 11F:
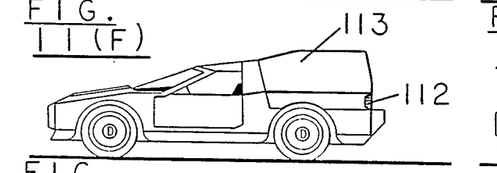
Figure 11G:
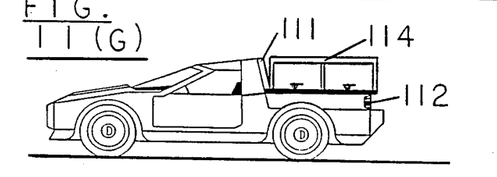
Figure 11H:
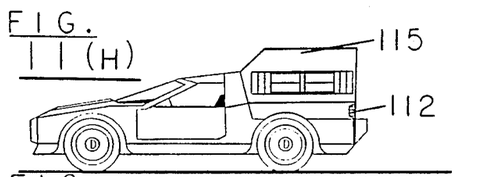
Figure 11I:
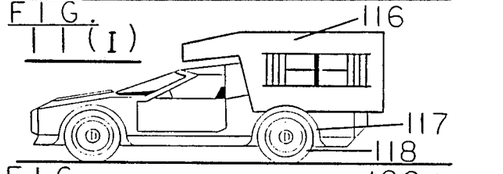
Figure 11J:
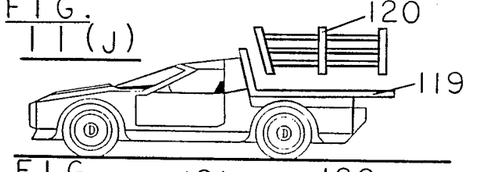
Figure 11K:
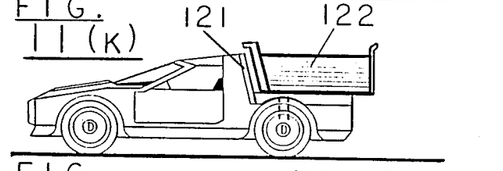

FIG. 11(a) shows a coupe package fitted to a core vehicle. By removing modules 100 and 101, we are left with a convertible-type vehicle as shown in FIG. 11(b). FIG. 11(b) shows alternate modules 105 and 106 exploded away. By removing module 102 from FIG. 11(b), modules 107 and 108 can be added to form the fastback version shown in FIG. 11(c). By removing module 107 and replacing it with module 110, the same vehicle is converted to the station wagon version in FIG. 11(d). By removing 108 and 110, we can add modules 111 and 112 to form the pick-up version of FIG. 11(e). Removing module 111 and adding module 113 forms the delivery van version of FIG. 11(f). Similarly removing module 113 and adding modules 111 and 114 forms the utility version of FIG. 11(g). Removing modules 111 and 114 and adding module 115 forms the camper cap version of FIG. 11(h). Like many of the modules shown here, the camper cap module 115 can be used either with auto-type module 108 or a pick-up type module 112. By removing modules 112 and 115 we then add module 116 and fenders 117 which will permit the use of dual rear truck tires 118 shown in FIG. 11(i). Camper module 116 as well as other modules shown in these drawings, may extend over and/or beyond the boundaries of the core vehicle as long as their mounting frames are compatable. By removing module 116, we then add module 119 to form a flatbed version shown in FIG. 11(j). Module 120 may be added to form a stakebody version. By removing modules 119 and 120 we then add module 121 to completely seal the core vehicle and then add dumping module 122 (see FIG. 11(k)). Hydraulics for dumping module may be self-contained within the module itself whereas one end of the hydraulic system is attached to the dumping section and the other is attached to the floor section of the module to achieve lift. Some modules, for example those of heavy weight and/or overlapping engagement, may not have to be connected at all to the core vehicle. Once such module slides into position, its own weight may be all that is needed to keep the module in place, similarly, such a module may only need to be key-locked. It may be possible as well with other modules discussed herein, that once the modules are aligned, a series of key locks with intermittent positioning along frame members may be used alone, or in combination with other connecting elements for attachment of modules to the cores.

Figure 11L:
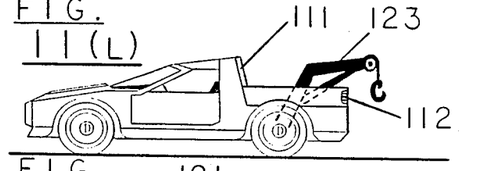
Figure 11M:
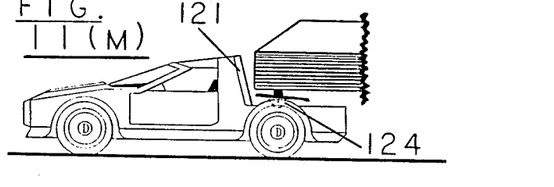

By removing modules 121 and 122, we can the add modules 111, 112, and 123 to form the two-truck type vehicle in FIG. 11(l), shown partially cut away. Module 123 may mount to adapter plate 29 and/or along other connecting areas in the floor sections of the various core vehicles. Some modules such as module 123 and other heavy-duty modules, may need to be bolted-in because of the increased stress which will be placed on these components. By removing modules 111, 112, and 123 the user can add modules 121 and 124 to form the "Fifth wheel" type towing package of FIG. 11(m), shown partially cut away. Module 124 in this case may be bolted onto adapter plate 29 because of increased stress.

Modules can be mixed and matched in arrangements other than those shown in FIG. 11 as long as the connecting frame elements that attach the modules together are compatable. Therefore, the invention is not limited to the vehicles shown in FIG. 11. For example, someone may want a delivery van with windows. To accomplish the desired result, the user selects the vehicle arrangement of FIG. 11(*f*), keeping pick up type module 112 attached, and replaces module 113 with module 110 shown in FIG. 11(*d*).

Everything that can be attached to the rear floor area of any core vehicle can be easily removed. Seats and carpeted mats, etc., may be added or removed at any time allowing full accessibility to any of the modules shown in FIG. 11.

According to the invention, the user can enjoy with one vehicle the benefits of a number of alternative functional vehicles. Since the modules are preferably constructed of light weight, durable materials, the change from one vehicle to another is a straightforward operation usually requiring no more than one or two people. It is possible to arrange modules so that changes can be made with the help of a winch type apparatus, mounted for example in the ceiling of a garage. Side jacks can also be employed to support modules being installed or removed while the core vehicle is driven under or out from under the module. With one vehicle having the ability to adapt to different uses, the consumer enjoys a multi-functioning vehicle having all the features they need, without the substantial added expense of duplication of drive trains, chassis components, etc., for each of the vehicles which might be required to perform separate functions. This also lowers the cost of replacement at trade-in time. At trade-in, the core vehicle may be the only component which needs replacing, whereby the consumer will save by not having to purchase new functional modules to replace the ones they already own.

Figures 12A, 12B, 12E:
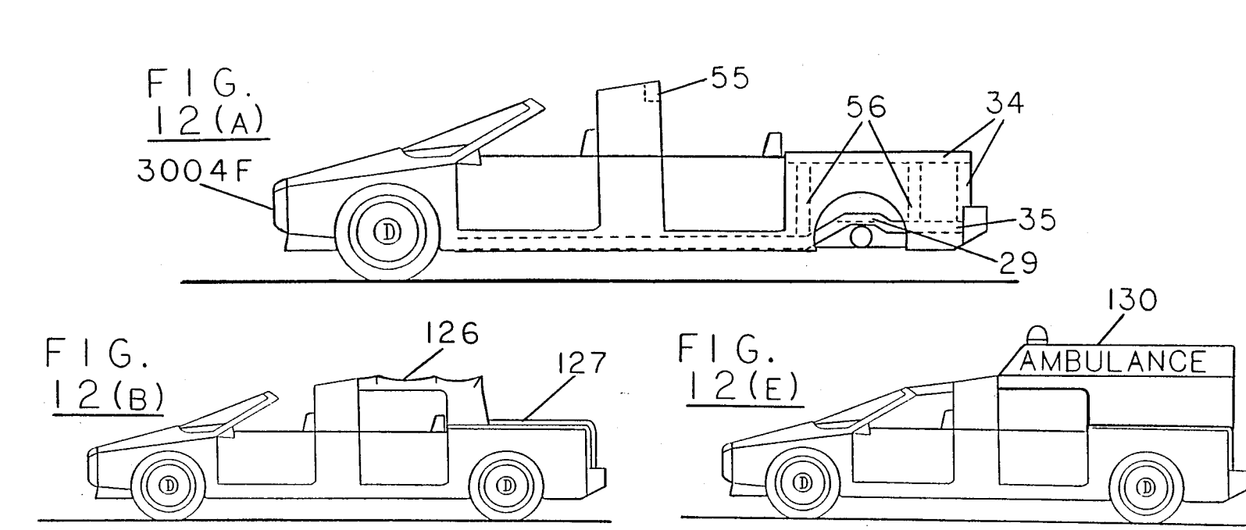
FIG. 12(a) through 12(g) show a partially cut away side view of a 4 door elongated type core vehicle (FIG. 12(a)), and side views of various design and functional modules attached to that vehicle (FIGS. 12(b) through 12(g)).
Figure 12C:
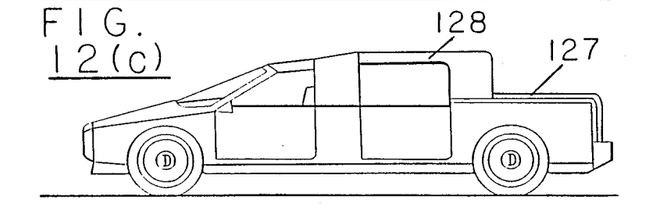
Figure 12D:
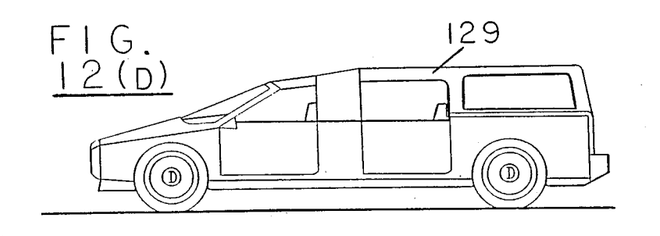
Figure 12F:
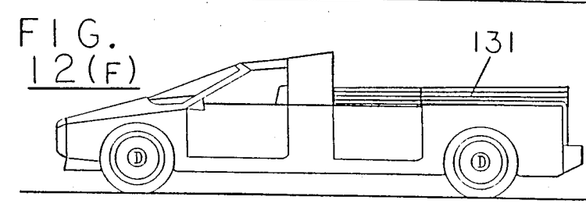
Figure 12G:
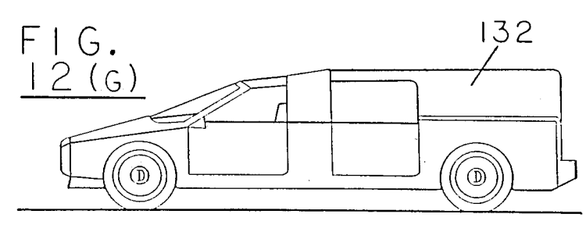

In FIG. 12*a* is shown a sectional side view of an elongated core vehicle. Alternate deck/frame 34 and frame 55 are used to attach non-self-contained 3000 Series modules. Frame 56 may be used for alignment, support, and/or attachment of modules. Adapter plate 29 and an elongated modified conventional frame 35 help to align and attach self-contained modules and to mount seats, etc., in the floor section of the vehicle FIG. 12*b* thru FIG. 12*g* show alternate design and functional modules of the 3000 Series vehicles. FIG. 12*b* adds modules 126, 127 to form a convertable type limousine where module 126 may be folded down to open the rear passenger compartment. By removing module 126 and adding module 128 the standard hardtop limousine is formed as shown in FIG. 12*c*. By removing modules 127, 128 and adding module 129, forms the station wagon type vehicle shown in FIG. 12*d*. A third rear facing seat may be added to the rear floor section of the vehicle. By removing module 129 and passenger seats, we can then add module 130 to form an ambulance version of the vehicle shown in FIG. 12*e*. Module 130 may have all the particulars to be self-sufficient with regard to its function. By removing module 130 we can add module 131 to form the flower car shown in FIG. 12*f*. By removing 131 and adding 132 we form the hearse version shown in FIG. 12*g*. It will be appreciated that many commercial and other functions are similarily served by providing conveniently-replaceable functional modules in this manner.

These vehicles discussed herein may be transformed from one type to any other type at any time. The sequence of course is not limited to the sequence specifically discussed herein. Preferred embodiments being set forth herein, reference should be made to the appended claims to define the scope of the invention.

I claim:
1. A modular vehicle comprising:
one of a plurality of functionally different core vehicles and at least one of a plurality of interchangeable functionally different body modules attached to the core vehicle, wherein the core vehicle is selected from automobile and truck types of configurations, the core vehicle having
a first closed contour frame deck engagement section spaced from a perimeter of a rear section of said core vehicle and an adapter floor plate mountable to said rear section of said core vehicle; and
said at least one module is selected from passenger, utility, occupational, recreational, and storage type configurations; and has a second engagement frame section adapted to conform and mount to said first frame section and aligning and connecting elements on said first and second sections for the interchangability of said modules.
2. The modular vehicle of claim 1, wherein said at least one body module comprises multiple sections of interchangeable modules.

* * * * *